(12) United States Patent
Schechter et al.

(10) Patent No.: US 9,594,607 B2
(45) Date of Patent: Mar. 14, 2017

(54) IDENTIFYING SOFTWARE APPLICATION EVENTS

(71) Applicant: Facebook, Inc., Menlo Park, CA (US)

(72) Inventors: Greg Schechter, Seattle, WA (US); Edward Kenneth O'Neil, Seattle, WA (US); David Miller, Seattle, WA (US); Daniel Tomko, Bellevue, WA (US)

(73) Assignee: Facebook, Inc., Menlo Park, CA (US)

( * ) Notice: Subject to any disclaimer, the term of this patent is extended or adjusted under 35 U.S.C. 154(b) by 52 days.

(21) Appl. No.: 13/963,261

(22) Filed: Aug. 9, 2013

(65) Prior Publication Data

US 2015/0046934 A1 Feb. 12, 2015

(51) Int. Cl.
G06F 9/54 (2006.01)
G06Q 30/06 (2012.01)
G06F 9/445 (2006.01)

(52) U.S. Cl.
CPC ............ *G06F 9/542* (2013.01); *G06F 8/60* (2013.01); *G06Q 30/0601* (2013.01)

(58) Field of Classification Search
CPC ........ G06F 9/542; G06F 8/60; G06Q 30/0601
See application file for complete search history.

(56) References Cited

U.S. PATENT DOCUMENTS

| | | | |
|---|---|---|---|
| 2008/0046880 A1* | 2/2008 | Jun et al. | 717/173 |
| 2008/0215468 A1* | 9/2008 | Monsa-Chermon | G06Q 10/00 705/34 |
| 2009/0222557 A1 | 9/2009 | Rudy | |
| 2011/0106875 A1* | 5/2011 | Koenig | G06Q 30/018 709/203 |
| 2011/0264662 A1 | 10/2011 | Umezu | |
| 2012/0023168 A1* | 1/2012 | Koren | 709/204 |
| 2012/0041878 A1* | 2/2012 | Yim | 705/44 |
| 2012/0324437 A1* | 12/2012 | Sakaguchi et al. | 717/170 |
| 2013/0041949 A1 | 2/2013 | Biesecker | |
| 2013/0042230 A1* | 2/2013 | Little et al. | 717/173 |
| 2013/0054720 A1 | 2/2013 | Kang | |
| 2013/0104118 A1* | 4/2013 | Somani et al. | 717/173 |
| 2013/0132854 A1* | 5/2013 | Raleigh et al. | |
| 2013/0205001 A1* | 8/2013 | Reed et al. | 709/224 |
| 2013/0316703 A1* | 11/2013 | Girard et al. | 455/432.1 |
| 2013/0325607 A1* | 12/2013 | Delug | 705/14.53 |
| 2014/0074601 A1* | 3/2014 | Delug | 705/14.53 |

OTHER PUBLICATIONS

International Search Report and Written Opinion for International Application PCT/US2014/050062, Nov. 28, 2014.

* cited by examiner

*Primary Examiner* — Charles E Anya
(74) *Attorney, Agent, or Firm* — Baker Botts L.L.P.

(57) ABSTRACT

In one embodiment, a method includes receiving, by a server computing device, a notification which includes: information associated with the identity of the user associated with the user-initiated event or with the identity of the client computing device; a variable, pre-determined string of symbols for the user-initiated event associated with the notification; a variable number describing a value of an attribute associated with the user-initiated event; and a variable parameter describing an attribute of the user at or near the time of the event or an attribute of the variable number. The method includes correlating, by the server computing device, the user-initiated events with a user; and determining, by the computing device, a description of the user-initiated event associated with the notification based at least in part on the string of symbols.

17 Claims, 4 Drawing Sheets

IDENTIFYING SOFTWARE APPLICATION EVENTS

TECHNICAL FIELD

This disclosure generally relates to identifying software application events.

BACKGROUND

Software applications provide functionality to users of computing devices, and allow a user to communicate with, provide instructions to, and receive output from computing devices. Software applications may execute various processes; such as presentation of information or other graphical content to a user; receipt of input (e.g., via a keyboard, mouse, voice recognition, biometric sensors, etc.) from the user; monitoring of internal execution and device resources (e.g., memory, etc.); communication with particular hardware components, other devices, and other software applications; or any other suitable process.

SUMMARY OF PARTICULAR EMBODIMENTS

Correlating events related to software application with the user of the software application provides benefits to the user of the application, the developer of the application, an advertiser of the application, etc. In one embodiment, a method for correlating such events to the user may include receiving a notification which includes: 1) a variable, predetermined string of symbols for the user-initiated event associated with the notification (such as a text string identifying the event); 2) a variable number describing a value of an attribute associated with the user-initiated event (such as a number of times the user has logged into the application or the time the event occurred); and a variable parameter describing an attribute of the user at or near the time of the event or an attribute of the variable number (such as group the user is a member of). The method further includes correlating the user-initiated events with the user, for example based on information received with the notification identifying the user or the computing device on which the event occurred. The method further includes determining a description of the user-initiated event associated with the notification based at least in part on the string of symbols. In particular embodiments, the user may restrict the information provided by the notification using any suitable privacy settings.

The above description merely provides examples of particular embodiments, which are described more fully herein.

DESCRIPTION OF EXAMPLE EMBODIMENTS

Figure 1:
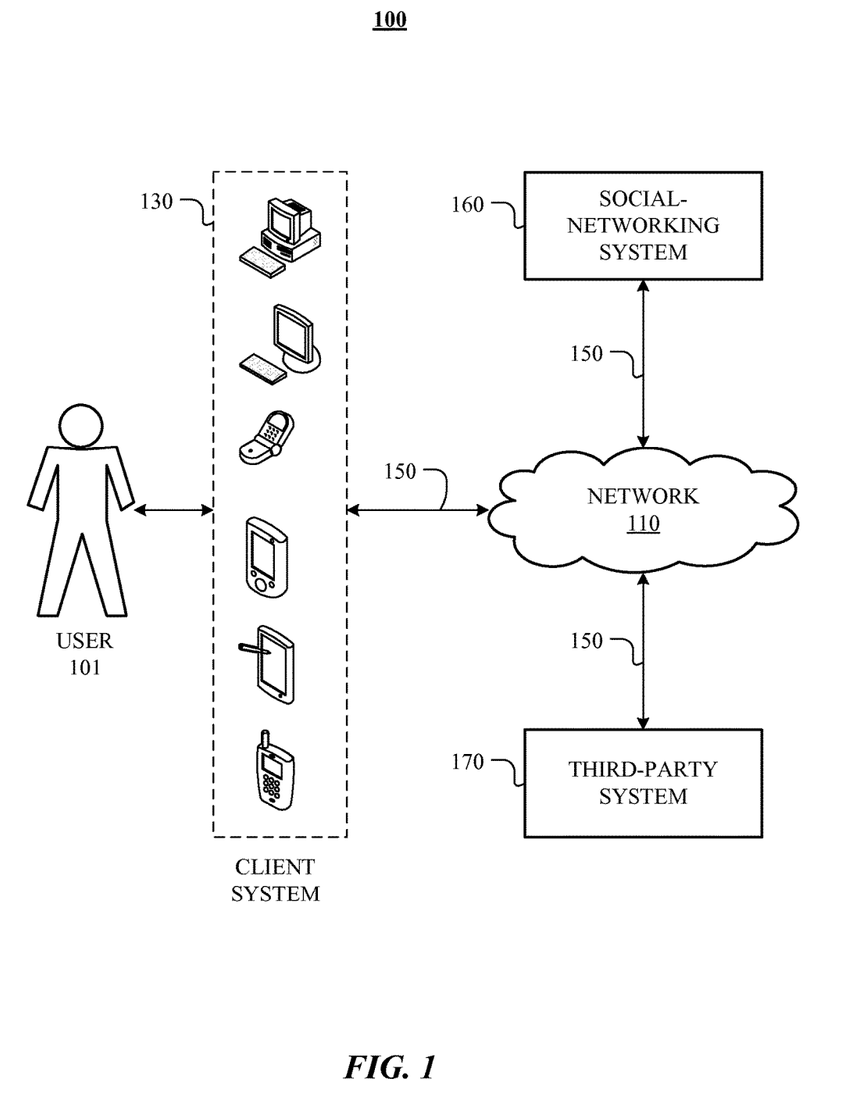
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 170 may be a network-addressable computing system. Third-party system 170 may generate, store, receive, and send third-party system data. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
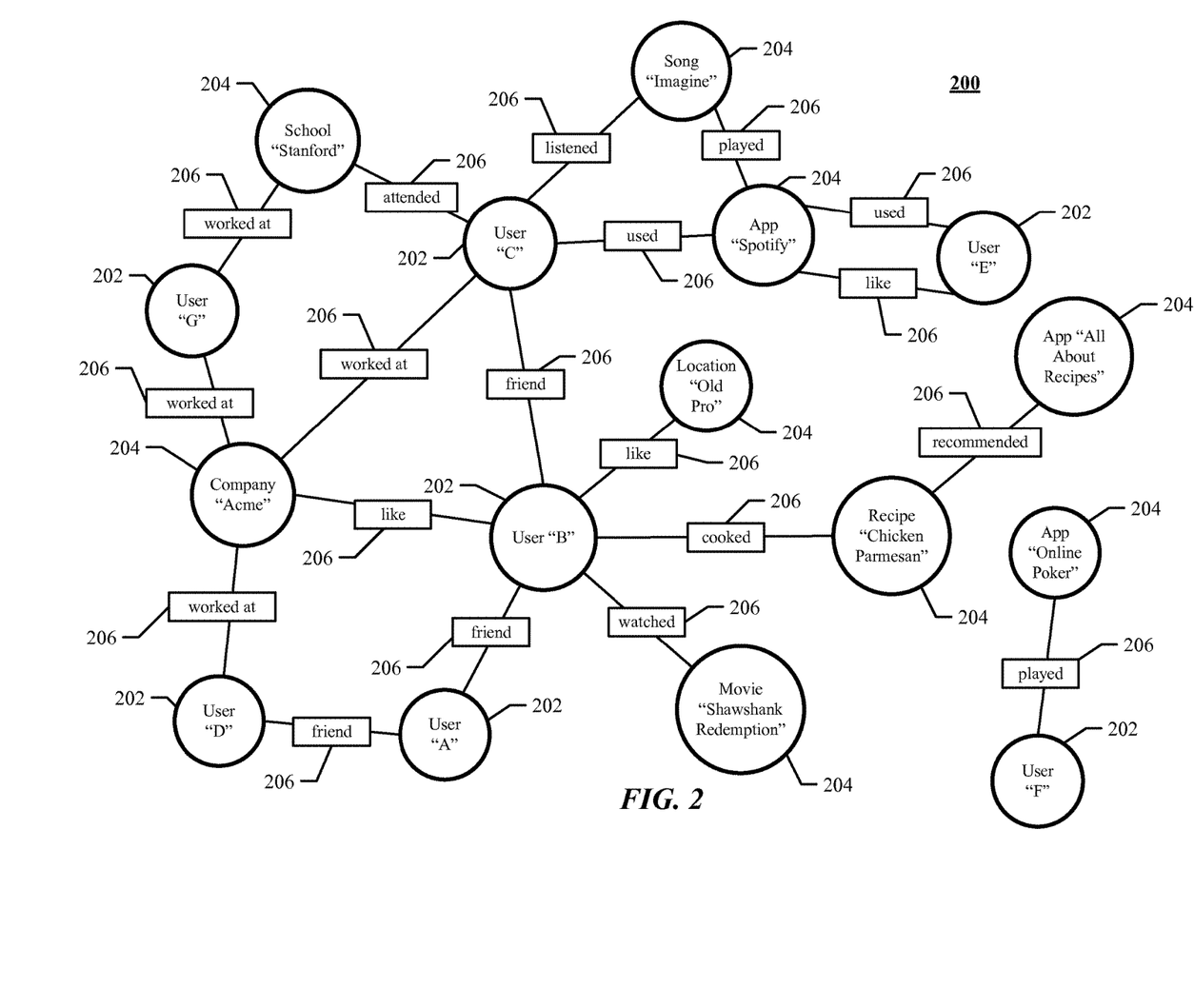
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened"

edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, one or more computing devices may identify user-initiated events related to software applications and correlate those events with particular users. In particular embodiments, software applications may be any suitable software application accessible by a client device, such as a software application stored at least in part on the client device, executable at least in part on the client device, or communicating with the client device. The computing device identifying the event may be any suitable computing device, such as the computing device executing the software, the computing device with which the user is interacting, a server computing device, etc.

Events may be any suitable event involving the software application. In particular embodiments, an event may be an installation of the software application on a client device. In particular embodiments, an event may be using a functionality of the software application. For example, using a tool to add a certain effect to a photo in a photo-editing software application or using a particular item in a game may be an event. In particular embodiments, an event may be an amount of time spent using the software application. For example, using the application for an hour may be one event, and using the application for 10 hours may be another event. In particular embodiments, an event may be an amount of time between use of the software or particular functionality of the software. In particular embodiments, an event may be use of a software application, such as loading the application or executing the application in the memory of the client computing device. In particular embodiments, an event may be an amount of use of a software application. For example, an event may be reaching a particular level or event in a game, using a particular amount of functionality in a database-management application, or editing a certain number of photos. In particular embodiments, an event may be a suitable combination of events. While this disclosure describes particular examples of particular types of events, this disclosure contemplates any suitable event associated with the software application.

Figure 3:
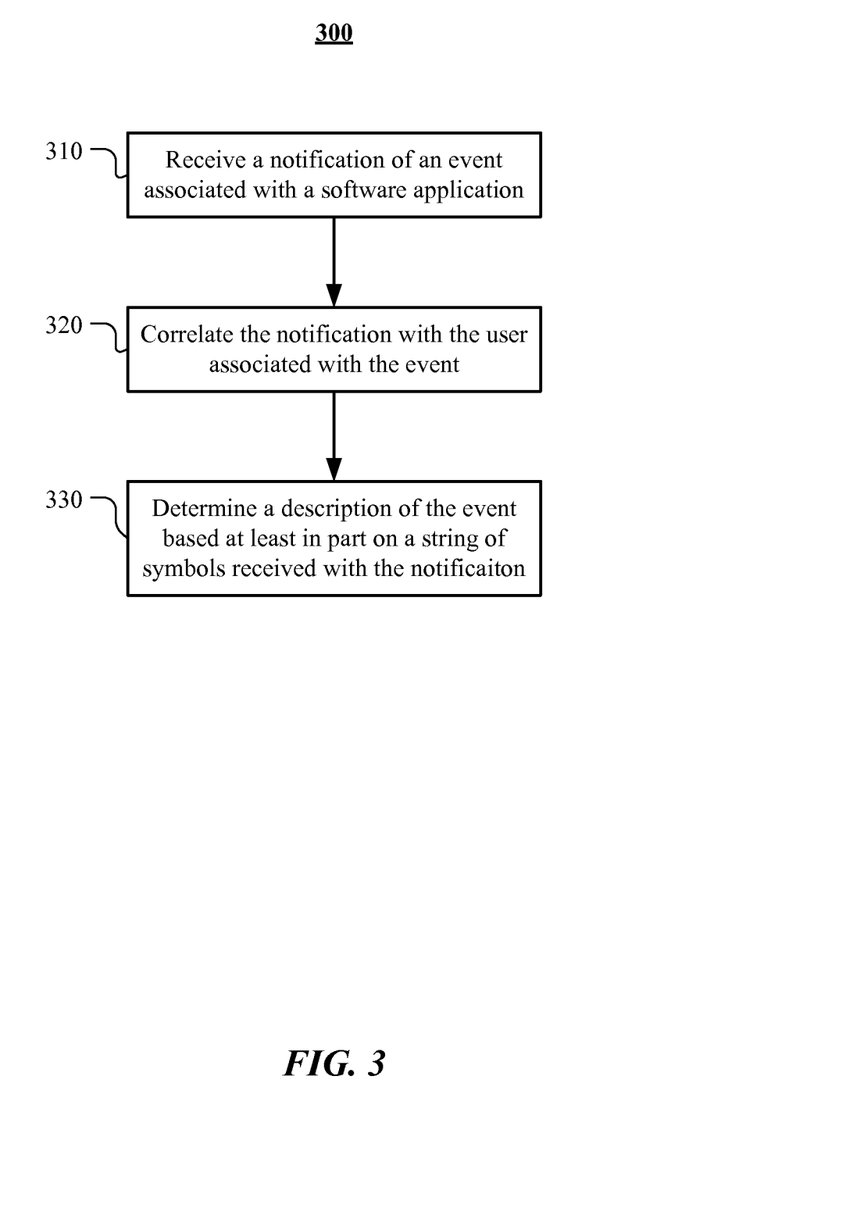
FIG. 3 illustrates an example method for identifying an event associated with a software application on a client computing device has occurred and correlating that event with a user of the client computing device.

FIG. 3 illustrates an example method 300 for identifying an event associated with a software application on a client computing device has occurred and correlating that event with a user of the client computing device. The method may begin at step 310, where a notification associated with an event is received by computing device. The receiving computing device may be any suitable computing device, such as the client computing device; a computing device associated with an ad publisher; a computing devices associated with network 110, third-party system 170, or social networking system 160; any suitable combination thereof; or any other suitable computing device. The notification may be sent by the client device, the advertiser or developer of the software application, a third-party analytics or advertising vender, or any other suitable entity. The notification may be sent immediately after an event has occurred, within or at a predetermined time period after the event has occurred, whenever the sending device is able to send the notification (e.g., has cellular network or wi-fi connectivity, etc), or any other suitable time(s).

In particular embodiments, the notification may comply with the specifications of a software development kit for the software application. The software development kit may be supplied by any suitable entity, such as an advertiser, an analytics service provider, an ad publisher, an operating system, a developer of a software application, or a social-networking system. In particular embodiments, the specifications of the software development kit may specify the format for the notification, when notifications should be made, protocols for providing notifications, etc. In particular embodiments, the software development kit may include one or more application programming interfaces for the software application.

In particular embodiments, a notification may include information identifying the user and/or client device associated with the user-initiated event. For example, the information may identify the user directly, such as with the user's name, with a unique ID number associated with the user (e.g. an ID number associated with a social network), or with a hash or other encoded information uniquely associated with the user. As another example, the information may indirectly identify the user. For example, the information may identify the user's client device (e.g. by an addressable hardware component, an account associated with the device, etc), which may be correlated with that user (e.g. by a cookie associated with the user and residing on the same device, by an account associated with the user and the device, etc.). Information identifying a user and/or a client device may use any of the methods for tracking mobile application or mobile device information described in patent application Ser. No. 13/748,560 titled "Conversion Tracking for Installation of Applications on Mobile Devices" and filed 23 Jan. 2013, which is incorporated by reference herein. While this disclosure provides specific examples of information and methods identifying a user associated with a user-initiated event, this disclosure contemplates any suitable information and methods identifying that user. In particular embodiments, privacy settings may allow a user to control what information (if any) identifying the user, the event, or both may be included with a notification.

In particular embodiments, a notification includes a variable, predetermined string of symbols for the event associated with the notification. The string of symbols may identify the event that has occurred. For example, a developer or advertiser of a software application may wish to identify when particular software-application-related events have occurred, and may include software code (e.g., in compliance with an SDK or provided at least in part by an API) that executes when the desired event occurs. The code may include a string that identifies the event. The string may be text (e.g., "the user has reached level 10" or "the user has used the application everyday for the past week"), may be a code associated with the event (e.g., "2Df%g@#3"), or any other suitable string. In accordance with the SDK and/or API, a string may be create, removed, or varied by the developer, advertiser, or any other suitable entity so that any suitable event may be identified. Any number of strings may be used to identify a corresponding number of events, and strings may be added, removed, or varied as the events to identify are added, removed, or varied.

In particular embodiments, a notification includes one or more variable numbers describing a value of a one or more attributes associated with the user-initiated event. For example, if an event is a user logging into or initiating an application, the variable number may described the time period since the user's last login or use of the application. As another example, if the event is a financial transaction initiated from the application or for products associated with the application (e.g., items in a game, etc.), then the variable number may describe the value of the transaction (e.g., the total amount of items bought, the total money spent, etc.). The variable number may also or in the alternative describe specifics about whether the user is a repeat purchaser, for example by indicating how many times the user has bought something in or through that application. As another example, a variable number may describe the amount of time a user has used the application (over the lifetime of the application, in a consecutive period, etc.) or a feature of the application. As another example, a variable number may describe the time at which the event occurred. In particular embodiments, the variable number may be determined from a social-networking system, such as from information associated one or more nodes or edges in a social graph associated with the social-networking system. While this disclosure provides specific examples of variable numbers describing example values of example attributes associated with example user-initiated event, this disclosure contemplates any suitable variable number describing any suitable value of any suitable attribute associated with an suitable user-initiated event.

In particular embodiments, a notification includes one or more variable parameters describing one or more attributes of a user at or near the time or the event or an attribute of the variable number. For example, a variable parameter may describe the currency associated with an amount of money spent in a financial transaction on or in the application. As another example, a variable parameter may describe an attribute of the user, such as for example that the user is a repeat purchaser, is a customer of a particular class (e.g., a member with particular status or benefits), has one or more attributes (e.g., sex, age, income), uses the particular client device and/or other particular devices, has used or shown interest in other applications, etc. In particular embodiments, the variable parameter may be determined from a social-networking system, such as from information associated with one or more nodes or edges in a social graph associated with the social-networking system. While this disclosure provides specific examples of variable parameters associated with specific attributes of a user or an attribute of a variable number, this disclosure contemplates any suitable variable parameter associated with any suitable attribute of a user or any suitable variable number.

After the notification is received, at step 320 the notification is correlated with the user associated with the event, such as by identifying the user associated with the event. For example, the user may be identified directly from information received with or in association with the notification. Such information may include the user's name, a unique ID number associated with the user (e.g. an ID number associated with a social network), or with a hash or other encoded information uniquely associated with the user. As another example, the user may be indirectly identified from information received with or in association with the notification. For example, the information may identify the user's client device (e.g. by an addressable hardware component, an account associated with the device, etc), which may be correlated with that user (e.g. by a cookie associated with the user and residing on the same device, by an account associated with the user and the device, etc.). Information identifying a user and/or a client device may use any of the methods for tracking mobile application or mobile device information described in patent application Ser. No. 13/748,560 titled "Conversion Tracking for Installation of Applications on Mobile Devices" and filed 23 Jan. 2013, which is incorporated by reference herein. While this disclosure provides specific examples of information and methods identifying a user associated with a user-initiated event, this disclosure contemplates any suitable information and methods identifying that user.

At step 330, a description of the event is determined at least in part on the string of symbols received in the notification. For example, the string may explicitly describe the event, such as "the user has installed the application." As another example, the string may be a code, e.g., "194836", that maps to a specific event generally, for that advertiser or developer of the software application, for that software application, of for that specific user. This disclosure contemplates any suitable method of determining the event based at least in part on the received string of symbols.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Once an event is correlated with a particular user, that information may be used to determine information relevant to or about that user. For example, such information may be used to calculate a lifetime value of the user for the software application or similar software applications. As another example, such information may be used to generate more effective ads and ad campaigns, both for users correlated to events and for other user having one or more similar characteristics as the users correlated to events. For example, particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. In the context of a social-networking system, an advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

Figure 4:
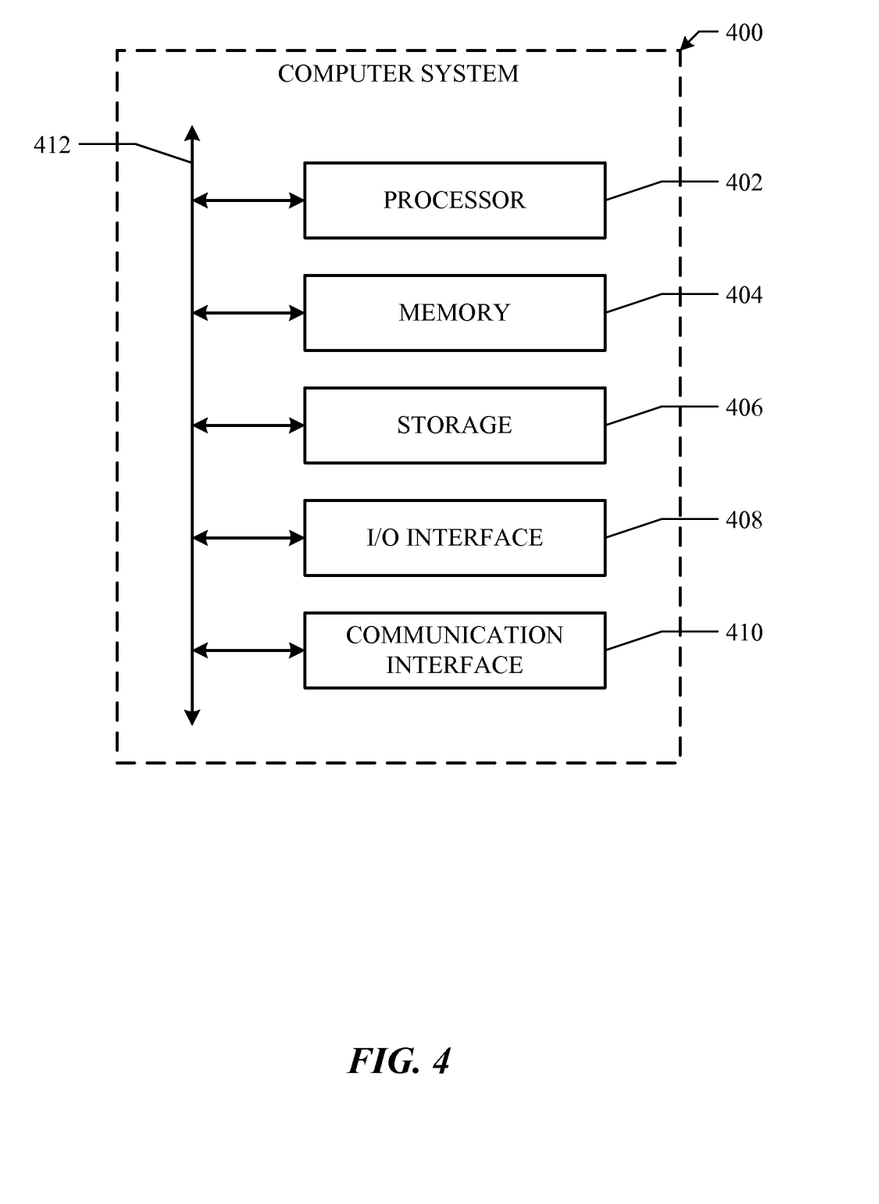
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of monitoring and correlating software related events, the method comprising:
   receiving, by a server computing device, a notification indicating that a user-initiated event associated with a software application on a client computing device has occurred, wherein the notification includes:
      information associated with the identity of the user associated with the user-initiated event or with the identity of the client computing device;
      a predetermined string of symbols that describes the user-initiated event;
      a number describing a value of an attribute associated with the user-initiated event, wherein the number identifies a frequency of use of a functionality of the software application or an amount of a purchase associated with the software application; and
      a parameter describing an attribute of the user at or near the time of the event or an attribute of the number;
   in response to receipt of the notification, correlating, by the server computing device, the user-initiated events with the user;
   determining, by the server computing device, a description of the user-initiated event associated with the notification based at least in part on the predetermined string of symbols; and
   determining, by the server computing device, an advertising campaign for a user based on the correlation and the determining steps.

2. The method of claim 1, wherein the client computing device comprises a mobile computing device.

3. The method of claim 1, wherein the event comprises an installation of the software application on the client computing device.

4. The method of claim 1, wherein the event comprises one or more of:
   a use of the software application;
   a use of a functionality of the software application;
   an amount of time spent interacting with the software application; or
   an amount of use of the software application.

5. The method of claim 1, wherein the predetermined string of symbols has been pre-determined by a developer or advertiser of the software application.

6. The method of claim 1, wherein the parameter comprises:
   a currency associated with a financial transaction associated with the software application;
   a group the user is a member of;
   a device the user has used;
   other software applications the user has used; or an interest of the user.

7. The method of claim 1, wherein the user-initiated event comprises a user interaction with the software application during a time that the software application is executed by the client computing device.

8. One or more computer-readable non-transitory storage media embodying software that is operable when executed to monitor and correlate software related events, the software include instructions to:
   receive, by a server computing device, a notification indicating that a user-initiated event associated with a software application on a client computing device has occurred, the notification includes:
      information associated with the identity of the user associated with the user-initiated event or with the identity of the client computing device;

a predetermined string of symbols that describes the user-initiated event;

a number describing a value of an attribute associated with the user-initiated event, wherein the number identifies a frequency of use of a functionality of the software application or an amount of a purchase associated with the software application; and a parameter describing an attribute of the user at or near the time of the event or an attribute of the number;

in response to receipt of the notification, correlate, by the server computing device, the user-initiated events with the user;

determine, by the computing device, a description of the user-initiated event associated with the notification based at least in part on the predetermined string of symbols; and determine, by the server computing device, an advertising campaign for a user based on the correlate and the determine steps.

9. The media of claim 8, wherein the client computing device comprises a mobile computing device.

10. The media of claim 8, wherein the event comprises an installation of the software application on the client computing device.

11. The media of claim 8, wherein the event comprises one or more of:
a use of the software application;
a use of a functionality of the software application;
an amount of time spent interacting with the software application; or
an amount of use of the software application.

12. The media of claim 8, wherein the predetermined string of symbols has been pre-determined by a developer or advertiser of the software application.

13. The media of claim 8, wherein the parameter comprises:
a currency associated with a financial transaction associated with the software application;
a group the user is a member of;
a device the user has used;
other software applications the user has used; or an interest of the user.

14. A system of monitoring and correlating software related events, the system comprising:
one or more processors; and
a memory coupled to the processors comprising instructions executable by the processors, the processors being operable when executing the instructions to:

receive, by a server computing device, a notification indicating that a user-initiated event associated with a software application on a client computing device has occurred, the notification includes:
information associated with the identity of the user associated with the user-initiated event or with the identity of the client computing device;
a predetermined string of symbols that describes the user-initiated event;
a number describing a value of an attribute associated with the user-initiated event, wherein the number identifies a frequency of use of a functionality of the software application or an amount of a purchase associated with the software application; and
a parameter describing an attribute of the user at or near the time of the event or an attribute of the number;

in response to receipt of the notification, correlate, by the server computing device, the user-initiated events with the user;

determine, by the server computing device, a description of the user-initiated event associated with the notification based at least in part on the predetermined string of symbols; and determine, by the server computing device, an advertising campaign for a user based on the correlate and the determine steps.

15. The system of claim 14, wherein the event comprises one or more of:
a use of the software application;
a use of a functionality of the software application;
an amount of time spent interacting with the software application; or
an amount of use of the software application.

16. The system of claim 14, wherein the predetermined string of symbols has been pre-determined by a developer or advertiser of the software application.

17. The system of claim 14, wherein the parameter comprises:
a currency associated with a financial transaction associated with the software application;
a group the user is a member of;
a device the user has used;
other software applications the user has used; or an interest of the user.

* * * * *